Aug. 5, 1930.  E. WILSON  1,772,093

SEAL

Filed April 22, 1929

Inventor:
Edward Wilson,
by Rippey & Kingsland
His Attorneys.

Patented Aug. 5, 1930

1,772,093

UNITED STATES PATENT OFFICE

EDWARD WILSON, OF ST. LOUIS, MISSOURI

SEAL

Application filed April 22, 1929. Serial No. 356,999.

This invention relates to seals and is especially designed and adapted for use in connection with rotary and rocking shafts of compressors or pumps, though it is clear enough from the following description that the device is capable of many advantageous uses.

An object of the invention is to provide an automatically adjustable seal designed and arranged to be mounted upon a rotating or rocking shaft of a compressor or pump, or other machine in which this improved seal is useful, and comprising a bellows having impervious connection with the wall of the machine and cooperating with lapping elements mounted on the shaft and arranged to wear smoothly and evenly so as to maintain an impervious joint.

Another object of the invention is to provide a device of the character and for the purpose mentioned including a spring actuator for pressing the lapping elements to proper cooperative relationship.

Other objects will appear from the following description, reference being made to the drawing in which—

Figure 1:
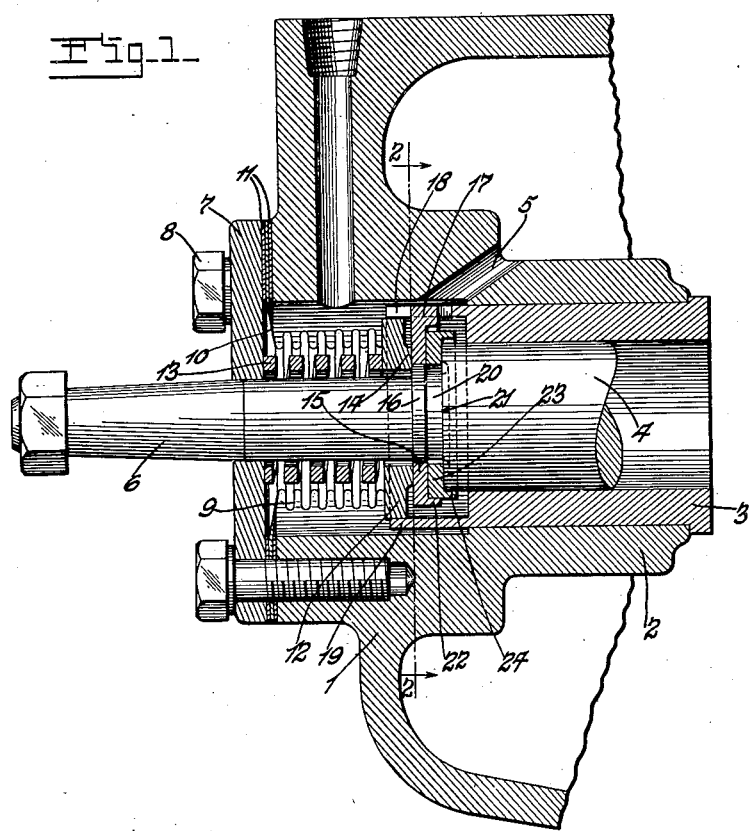
Fig. 1 is a longitudinal sectional view of the invention embodied in a compressor or pump.
Figure 2:
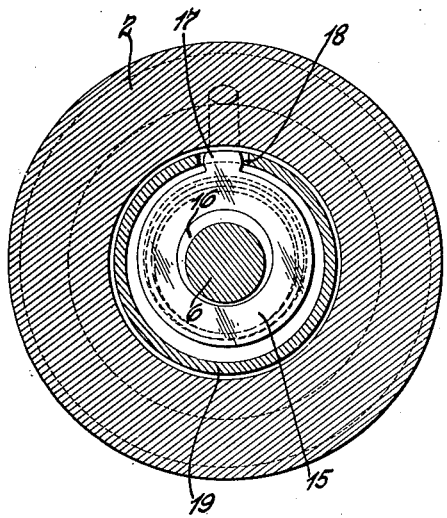
Fig. 2 is a cross sectional view approximately on the line 2—2 of Fig. 1.
Figure 3:
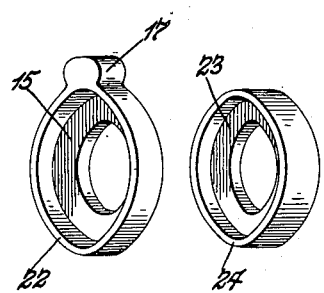
Fig. 3 is a perspective view showing the two lapping elements separated from each other and from the remaining machine parts.

The machine in which the invention is shown comprises a frame or housing 1 equipped or formed with a bearing 2 having therein a rigid bushing 3 in which the shaft 4 is journaled for rotary or rocking operations. The bearing 2 is provided with a hole 5 which constitutes a passage for oil. The shaft 4 has a reduced portion 6 extending through an end plate 7 attached to the frame 1 by bolts 8 or other appropriate fasteners.

A bellows 9 has a flared end 10 embraced between two packing rings 11 clamped between the plate 7 and the end of the frame 1 so as to obtain an impervious joint. The inner end of the bellows 9 is attached to a ring 12 having a hole therethrough of less diameter than the inside diameter of the bellows 9 and forming an abutment for the inner end of a strong spring 13 enclosed within the bellows 9. The outer end of the spring 13 abuts against the plate 7. The inner side of the ring 12 is formed with an annular flange 14 extending around the hole in said ring and abutting against the flat outer surface of a ring 15.

The ring 15 is mounted on an eccentric 16 rigid or integral with the reduced portion 6 of the shaft 4 so that said ring 15 is continually operated eccentrically with respect to the axis of the shaft 4 when said shaft is rotated or rocking. A peripheral projection 17 from the ring 15 engages in a slot 18 in a cylindrical extension 19 of the bushing 3. Accordingly, it is clear that the ring 15 is held from rotating or rocking with the shaft 4. The eccentric 16 does not prevent close and sealing contact of the inner edge or end of the flange 14 with the smooth outer surface of the ring 15, but permits such close contact that an impervious joint is formed and continuously maintained. The ring 12 is enclosed within the cylindrical extension 19. Because the periphery of the ring 12 is close to the inner periphery of the cylindrical part 19 it is impossible for the ring 12 to accompany the ring 15 in its eccentric movements. But, the cylindrical part 19 does not prevent nor interfere with the action of the spring 13 in its intended function of holding the edge or end of the flange 14 continuously in close sealing contact with the ring 15.

A circumferential groove 20 is formed in the reduced portion of the shaft 6 between the eccentric 16 and the abrupt shoulder 21 on said shaft 4 at the union of said shaft with the reduced extension 16 thereof. The groove 20 is extended into the end of the shoulder 21 so that there is an annular groove in said shoulder.

The ring 15 is formed with an annular flange 22. This annular flange 22 is concentric with the axis of said ring and is therefore always eccentric with respect to the axis of the shaft 4. A ring 23 is mounted between the ring 15 and the shoulder 21 and is of no greater thickness than the width of the groove 20 so that the eccentric 16 does not at any time interfere with the eccentric or radial movements of said ring 23. The ring 23 is of less diameter than the inside diameter of the flange 22 and is partly enclosed within said flange. As a consequence of this arrangement the ring 23 is forced in eccentric or radial movements or both when the shaft 4 is rotating or rocking; because the radial distance between the outer periphery of the ring 23 and the inner periphery of the flange 22 is less than the radial height of the eccentric 16. Accordingly, the ring 15 is essentially moved by the eccentric 16 in radial or eccentric movements to an extent greater than the distance between the outer periphery of the ring 23 and the inner periphery of the flange 22.

Extent of radial movement of the ring 23 with respect to the axis of the shaft 4 is limited by an annular flange 24 on said ring 23 enclosing the shoulder 21 of the shaft 4. This prevents the ring 23 from moving eccentrically or radially to the full extent that the ring 15 moves radially or eccentrically.

From the foregoing it is clear enough that there is always a lapping action between the end or edge of the flange 14 and the outer surface of the ring 15; that there is always a lapping action between the contacting surfaces of the rings 15 and 23; and that there is always a lapping action between the ring 23 and the shoulder 21. Consequently all wear on any of these parts is taken up, an impervious joint is constantly maintained, and no portion of any two contacting surfaces can wear faster than any other portion of said two contacting surfaces. Accordingly, my invention obtains all of its intended objects and purposes in a highly efficient and satisfactory manner. It is maintained in a lubricated condition by oil from the passage 5. The oil may fill almost the entire space between the end of the bushing 3 and the plate 7.

The device may be varied within equivalent limits without departure from the nature and principle thereof. I do not restrict myself in any unessential respects, but what I claim and desire to secure by Letters Patent is:—

1. The combination with a bearing, and a shaft mounted for turning movements in said bearing and having a circumferential shoulder, of a sealing ring abutting against said shoulder and forming therewith an hermetic point, a flange on said ring enclosing a portion of said shaft at said shoulder and having an internal diameter larger than the diameter of said shaft and arranged to contact with said shaft to limit extent of radial movements of said ring, an actuating ring seated against the outer side of said sealing ring, means for imparting eccentric and radial movements to said actuating ring by said shaft as an incident to the turning of said shaft, a third ring bearing against the outer side of said actuating ring and forming therewith an hermetic joint, a rigid wall through which said shaft extends, a bellows forming an impervious enclosure around said shaft between said third ring and said wall, and a spring mounted about said shaft within said bellows having one end bearing against said wall and the opposite end against said third ring and holding said three rings in the relationship to each other as aforesaid.

2. The combination with a bearing, and a shaft mounted for turning movements in said bearing and having a circumferential shoulder, of a sealing ring abutting against said shoulder and forming therewith an hermetic joint, a flange on said ring enclosing a portion of said shaft at said shoulder and having an internal diameter larger than the diameter of said shaft and arranged to contact with said shaft to limit extent of radial movements of said ring, an actuating ring seated against the outer side of said sealing ring, means for imparting eccentric and radial movements to said actuating ring by said shaft as an incident to the turning of said shaft, a third ring bearing against the outer side of said actuating ring and forming therewith an hermetic joint, a rigid wall through which said shaft extends, a bellows forming an impervious enclosure around said shaft between said third ring and said wall, a spring mounted about said shaft within said bellows having one end bearing against said wall and the opposite end against said third ring and holding said three rings in the relationship to each other as aforesaid, and means for imparting radial movements to said sealing ring by said actuating ring.

3. The combination with a bearing, and a shaft mounted for turning movements in said bearing and having a circumferential shoulder, of a sealing ring abutting against said shoulder and forming therewith an hermetic joint, a flange on said ring enclosing a portion of said shaft at said shoulder and having an internal diameter larger than the diameter of said shaft and arranged to contact with said shaft to limit extent of radial movements of said ring, an actuating ring seated against the outer side of said sealing ring, means for imparting eccentric and radial movements to said actuating ring by said shaft as an incident to the turning of said shaft, a third ring bearing against the outer side of said actuating ring and forming therewith an hermetic joint, a rigid wall through which said shaft extends, a bellows forming an impervious enclosure around said shaft between said third ring and said wall, a spring mounted about said shaft within said bellows having one end bearing against said wall and the opposite end against said third ring and holding said three rings in the relationship to each other as aforesaid, means for imparting radial movements to said sealing ring by said actuating ring, and means for preventing said actuating ring from turning with said shaft.

4. The combination with a housing, a shaft extending through the wall of said housing, and a bearing in which said shaft is mounted for turning movements, of a seal for preventing leakage through said wall about said shaft comprising a circumferential shoulder on said shaft having a radial wall, a sealing ring abutting against said wall and forming therewith an hermetic joint, an eccentric on said shaft, an actuating ring mounted on said eccentric and bearing against the outer side of said sealing ring and forming therewith an hermetic joint, means for preventing said actuating ring from turning with said shaft, means whereby said actuating ring will impart radial and eccentric movements to said sealing ring and will lap against said sealing ring and cause said sealing ring to lap against said shoulder when said shaft is turned, a flange in connection with said sealing ring cooperating with said shaft to limit extent of radial movements of said sealing ring, a third ring bearing against the outer side of said actuating ring and forming therewith an hermetic joint, means preventing radial movements of said third ring, a bellows forming an impervious enclosure about said shaft from said third ring to the wall of said housing, and a spring enclosed in said bellows and holding said third ring seated against said actuating ring.

5. The combination with an enclosing wall, a bearing, a shaft mounted for turning movements in said bearing and extending through said wall, and a circumferential shoulder formed on said shaft and having a radial wall, of a seal comprising an eccentric on said shaft, an actuating ring mounted on said eccentric, a lapping ring located between said actuating ring and said shoulder and forming therewith hermetic joints, means for imparting radial and eccentric lapping movements to said lapping ring by said actuating ring when said shaft is turned, means on said lapping ring cooperating with said shaft to limit extent of said radial movements, a third ring bearing against the outer side of said actuating ring, and a bellows having one end connected with said third ring and the opposite end connected with said first named wall and forming an hermetic enclosure about said shaft between said third ring and said first named wall.

6. The combination with an enclosing wall, a bearing, a shaft mounted for turning movements in said bearing and extending through said wall, and a circumferential shoulder formed on said shaft and having a radial wall, of a seal comprising an eccentric on said shaft, an actuating ring mounted on said eccentric, a lapping ring located between said actuating ring and said shoulder and forming therewith hermetic joints, means for imparting radial and eccentric lapping movements to said lapping ring by said actuating ring when said shaft is turned, means on said lapping ring cooperating with said shaft to limit extent of said radial movements, a third ring bearing against the outer side of said actuating ring, a bellows having one end connected with said third ring and the opposite end connected with said first named wall and forming an hermetic enclosure about said shaft between said third ring and said first named wall, means for preventing said actuating ring from turning with said shaft, and a spring holding said rings in the relationship aforesaid.

EDWARD WILSON.